United States Patent [19]

Verhulst et al.

[11] 4,214,897

[45] Jul. 29, 1980

[54] PROCESS FOR THE EXTRACTION OF NON-FERROUS METALS FROM SLAGS AND OTHER METALLURGICAL BY-PRODUCTS

[75] Inventors: Dirk E. V. Verhulst, Edegem; Robert H. Maes, Hove; Luc M. Fontainas, Antwerp, all of Belgium

[73] Assignee: Metallurgie Hoboken Overpelt, Hoboken, Belgium

[21] Appl. No.: 2,228

[22] Filed: Jan. 9, 1979

[30] Foreign Application Priority Data

Jan. 13, 1978 [LU] Luxembourg ............... 78869
Nov. 10, 1978 [LU] Luxembourg ............... 80506

[51] Int. Cl.$^2$ ................ C21C 5/52; C21B 3/04
[52] U.S. Cl. ........................... 75/11; 75/24
[58] Field of Search ............ 75/11, 24, 25, 445

[56] References Cited

U.S. PATENT DOCUMENTS

| 1,822,396 | 9/1931 | Fowler | 75/24 |
| 1,822,588 | 9/1931 | Fowler | 75/24 |
| 4,110,107 | 8/1978 | Paulson | 75/24 |

FOREIGN PATENT DOCUMENTS

| 474486 | 6/1975 | Australia | 75/24 |
| 7113 | of 1915 | United Kingdom | 75/24 |
| 366168 | 4/1932 | United Kingdom | 75/24 |
| 1176655 | 1/1970 | United Kingdom | 75/24 |

OTHER PUBLICATIONS

"Process for Reducing Molten Furnace Slags by Carbon Injection", (U.S. Dept. of Interior, 6/1977).
Paulson & Hunter, "Recovering Iron from Copper Smelting Furnace Slags by Carbon Injection", (U.S. Dept. of Interior, 1977).

Primary Examiner—P. D. Rosenberg
Attorney, Agent, or Firm—Pennie & Edmonds

[57] ABSTRACT

Non-ferrous metals are extracted from molten slags 9 by treating the latter in an electric furnace with submerged electrodes 2 under a layer of a solid reducing agent 8. During the extraction, a non-oxidizing gas is injected into the molten material at a flow rate of between 0.5 and 10 Nm3/h/ton of material treated (FIG. 1).

13 Claims, 2 Drawing Figures

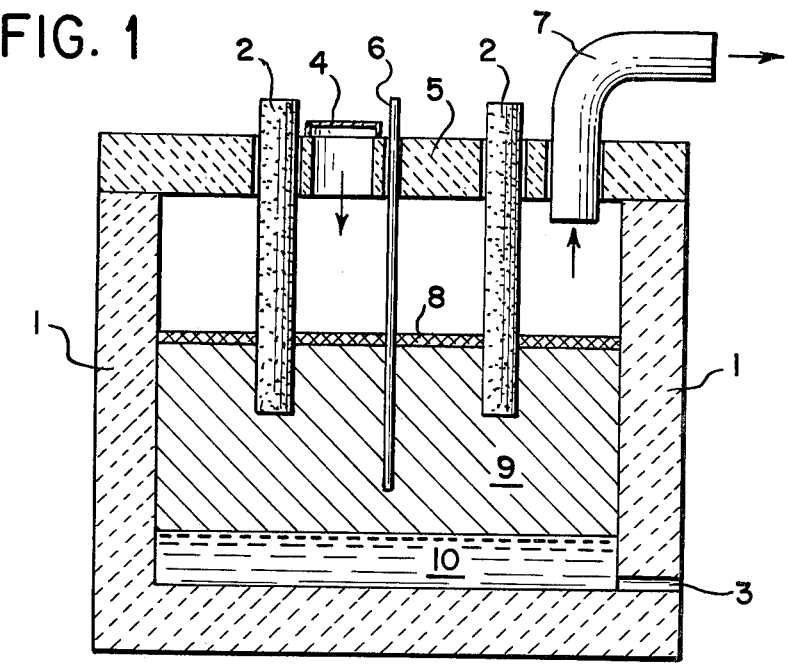
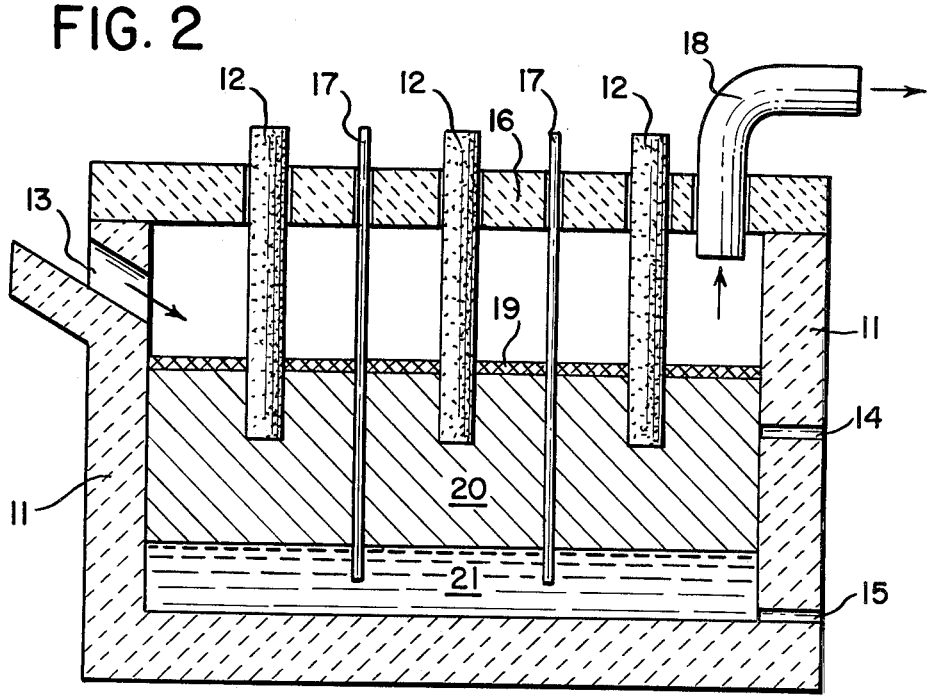

PROCESS FOR THE EXTRACTION OF NON-FERROUS METALS FROM SLAGS AND OTHER METALLURGICAL BY-PRODUCTS

TECHNICAL FIELD

The present invention relates to a process for the extraction of non-ferrous metals from slags and other metallurgical by-products. These materials are treated in the molten state by heating them by resistance in an electric furnace with submerged electrodes, under a layer of solid reducing agent and by injecting a non-oxidizing gas into the molten material in order to produce an efficient stirring of the molten material.

BACKGROUND ART

A process for treating molten slags from the non-ferrous metallurgy is already known by German Offenlegungsschrift nr. 2,727,618. In this process, a solid carbonaceous reducing agent is distributed onto the surface of molten slag where it forms a layer. A non-oxidizing gas is injected in an amount and with a flow rate so that molten slag is circulated, projected through the layer of carbonaceous reducing agent, and filtered by it. According to this process, the flow of non-oxidizing gas, which is injected into the liquid slag, is preferably between about 30 to about 100 Nm3/h per metric ton of slag (the unit $Nm^3/h$ represents standard cubic meters per hour).

One drawback of this process is that the high flow of gas injected into the liquid slag creates agitation which is not compatible with the operation of an electric furnace with submerged electrodes. Normal operation involves a smooth, continuous operation which preferably extends over long periods without interruptions. For example, comparative to operation without injection of gas, this operation is electrically less stable, which is shown by sudden and violet fluctuations of the current and of the instantaneous power consumed by the furnace. Also, the power factor (cos $\phi$) reaches values which are much lower than those prevailing with an operation without such injection. Consequently, special devices must be provided in order to correct the electrical fluctuations or penalties will eventually be applied by the power distributors. On the other hand, violent agitation of the slag will tend to accelerate wear on the furnace lining and to project liquid material on the roof and the side-walls of the furnace. These are factors which contribute to a reduction of the life of the furnace and a limitation of the possibilities of long lasting continuous operation.

Another drawback of this process is that high gas flow may lead to an important volatilization of metals whose vapour pressure is high at operating temperature. This may be considered an advantage for some metals, such as zinc, which are commonly recovered in the dust obtained from the gaseous phase during reduction smelting operations. This volatilization is however undesirable and must preferably be limited to a minimum for other metals, such as lead, which are preferably recovered directly in the liquid state from the slag to be reduced. If lead and zinc are simultaneously present in the slag to be reduced, a compromise has to be found between the volatilizations of both metals. In this situation, it is observed that an optimum often corresponds to relatively low volatilization rates, which are impossible to achieve under the conditions of the prior art process.

Another drawback of this process is that the high flow of gas blown into the slag leaves the bath at a high temperature. The gas absorbs thermal energy in significant amounts, which can be difficult to recover efficiently and which has to be compensated by addition of electric energy to the electrodes of the furnace.

A further drawback of the prior art process is the large consumption of non-oxidizing gas. Consequently, the cost of the gas may constitute an important fraction of operating costs and make the operation uneconomical, for example, when untreated slag contains relatively small amounts of valuable metals or when the value of these metals is relatively low. The aim of the present invention is to avoid these various drawbacks.

DISCLOSURE OF THE INVENTION

According to the invention, non-oxidizing gas is injected at a rate of between about 0.5 to about 10 Nm3/h/ton of material treated. In order to realize a sufficient contact between treated material and reducing agent, it is not necessary to stir the slag so vigorously that it is projected through the layer of the reducing agent. On the contrary, it is sufficient to form a smooth and regular convection of the slag, so that each particle of said slag has an opportunity to come into contact with the reducing agent in order to be reduced. Thus, it has been observed that below about 0.5 Nm3/h/ton of material treated, the efficiency of stirring is low, whereas above about 10 Nm3/h/ton of material treated, an excessive stirring is produced, which inhibits metallurgical performances and causes increased instability in the operation of the furnace, as well as excessive production of dust and consumption of energy.

On the other hand, it has been found that in the range of flows from about 0.5 to about 10 Nm3/h/ton of material treated, metallurgical performances, measured for instance by the speed at which a given metal is reduced, do not improve proportionally to the flow. Rather the greatest improvement is obtained at the lower flows because at high flow, any increase of flow only brings smaller and smaller improvements. For metals such as zinc, which are reduced in the gaseous state and consequently carried over by furnace gas, the total amount of gas brought into contact with a given amount of slag plays an important role, and a substantial improvement of the metallurgical performances is obtained up to the flow of about 10 Nm3/h/ton. For metals such as lead, which are preferably reduced in the liquid state, the total amount of gas brought into contact with a given amount of slag plays a less important role, and substantial improvements of the metallurgical performances are no longer observed for flows exceeding about 2.5 Nm3/h/ton. Thus for such metals, it is advantageous to operate with flows lower than about 2.5 Nm3/h/ton.

When an untreated material contains at least two metals which are preferably extracted in the liquid state, one of which is an easily reducible metal, such as lead, and the other is a less reducible metal, such as tin, it is known that the easily reducible metal is reduced first and that the less reducible metal is reduced afterwards. It is also known that the reduction of the less reducible metal is made easier when that metal has some solubility in the easily reducible metal, due to a lowering in its chemical activity. However, this effect can only be advantageous if the easily reducible metal is brought in intimate contact with the material to be treated during the reduction of the less reducible metal.

In applicants' process, intimate contact is not realized when the blowing of the non-oxidizing gas occurs in the layer of slag because the metal then stagnates at the bottom of the furnace, without any possible chemical exchange with the slag lying above it. In this situation, it is advantageous to inject the non-oxidizing gas in the layer of liquid metal, in order to carry, to project and to disperse the metal in the layer of slag. A flow of non-oxidizing gas between about 0.5 and about 2.5 Nm3/h/ton of material treated is sufficient to obtain a good dispersion of the metal in the slag while maintaining a good stability of operation of the furnace.

Instead of preparing the layer of easily reducible metal by reduction of the slag, it is also possible to start the reduction operation in the presence of a layer of metal, more particularly when the slag only contains less reducible metals which have to be recovered in the liquid state. When the aim is to recover less reducible metals which are soluble in iron, such as nickel and cobalt, the layer of metal, in which the non-oxidizing gas is blown, advantageously contains a ferrous alloy, added before or formed during the reduction of the slag.

The non-oxidizing gas can be an inert gas, such as nitrogen, or a reducing gas, such as hydrogen, methane or natural gas. In the subject process, the use of natural gas or a hydrogen-containing gas is preferred because such gases take part in the reduction operation thereby favorably influencing the reduction speed and lowering the required quantity of solid reducing agent. Natural gas has an additional advantage of being readily available and relatively inexpensive.

On the other hand, when using this gas, it has been observed that the rate of injection in the material treated must preferably be greater than about 5 m/sec in order to avoid cracking of the gas in the injection nozzle; such an injection rate also contributes to efficient stirring of the material to be treated. As a hydrogen-containing gas, it is possible to use reformed natural gas.

Operation of the process of the present invention mostly requires the addition to the material to be treated of fluxes necessary to produce a depleted slag with adequate physical and chemical properties. In particular, it is known that a good extraction of metals often requires the presence of a sufficient amount of CaO in the depleted slag. This presence is normally ensured by the addition of limestone or burnt lime. When the material to be treated is fed in the solid state, a simple way of adding the fluxes consists in mixing them with the charge of the furnace. When the material to be treated is fed in the liquid state, the previous mixing method cannot be applied. Here, fluxes can easily be added, together with the solid-reducing agent, by simple distribution on the surface of the bath.

The injection of the non-oxidizing gas, which characterizes the process of the invention, is suficient to ensure a good contact between the material to be treated and the fluxes and a rapid dissolution of the latter.

When the metals to be extracted are preferably recovered in the liquid state, it is advantageous to operate the process at the lowest possible temperature consistent with the melting points of the metal and the depleted slag, particuarly when the metals to be extracted, such as lead, have a relatively high vapor pressure and a relatively strong tendency to be volatilized. In this instance, it is advantageous to choose a slag composition which is sufficiently fusible to allow operation at a temperature higher than about 1100° C. and lower than about 1250° C.

The process of the present invention may be applied to continuous as well as to discontinous operations. In a continuous operation, the average reduction speed is lower than in the same furnace operating discontinuously on the same charge perhaps because the material to be treated undergoes a dilution by the content of the furnace as soon as it is introduced in the furnace. To obtain the same level of reduction of the depleted slag, the decrease of the average reduction speed is then compensated by an increase in the residence time of the material to be treated in the furnace. Consequently, flows of non-oxidizing gas, which produce a significant increase in the reduction speed, will correspond to notably higher comsumptions of non-oxidizing gas per ton of material to be treated, so that the process may eventually become less profitable when the materials to be treated contain relatively small quantities of valuable metals or when the value of these metals is relatively low. In such circumstances, it is advantageous to operate with relatively low gas flows, preferably between about 0.5 and about 1.5 Nm3/h/ton of material treated. In a continuous operation, it is also advantageous to decrease the effect of the dilution of the materials to be treated by the content of the furnace, by operating in a furnace of elongated shape, where untreated materials are fed at one end while depleted slag is tapped at the opposite end.

The process of the invention and its advantages are described in detail below with reference to drawings and examples which illustrate it:

BRIEF DESCRIPTION OF THE DRAWINGS

FIG. 1 schematically represents a vertical section of a first type of furnace used for carrying out the process of the present invention; and FIG. 2 schematically represents a vertical section of a second type of furnace used for carrying out the process of the present invention.

BEST MODE FOR CARRYING OUT THE INVENTION

Example 1

The process of the invention was carried out in the furnace illustrated in FIG. 1. The furnace had a nominal power of 60 kVA (kilo-volt-ampere) and a useful volume of 200 liters. It had a rectangular section with an inside width of 50 cm and an inside length of 90 cm. It comprised essentially a crucible 1, two graphite electrodes 2 connected to a power supply (not shown), a tap hole 3, a charging door 4, a roof 5, a tube 6 for injecting non-oxidizing gas in the lower central part of crucible 1 and an outlet duct 7 for the exhaust gases. The tube 6 was alumina. It had an inside diameter of 10 mm, and its lower end was located 20 cm above the bottom of crucible 1.

850 kg of a liquid slag containing, in % by weight, 30 Pb, 1.5 Sn, 4.6 Zn, 12 CaO, 15 $SiO_2$, 12 Fe, was treated in the furnace. The height of the bath was 50 cm. Natural gas was injected through tube 6 with a flow of 1.7 Nm3/h, and coke 8 is added in such a way that the slag bath 9 was constantly covered with a thin layer of coke (about 1 to 2 cm). For this purpose about 5 kg of coke must be added per hour. The temperature of the slag was kept at about 1230° C.; for this purpose, a power of 37 kW must be supplied. Lead and tin, which were extracted from slag 9, formed a metallic phase designated by 10. Zinc, which was also extracted from the slag, left the furnace with the gases resulting from the reduction treatment (CO, $CO_2$, $H_2$, $H_2O$), through duct 7. After 5 hours of operation, the lead content of the slag had fallen to 0.5% by weight, the tin content to 0.8% by weight and the zinc content to 2% by weight. At that moment, the total height of the bath was 42 cm, of which 35 cm was of slag and 7 cm was of metal.

It should be noted that, when operating under the same conditions but without injection of non-oxidizing gas, the degree of depletion of the slag was only reached after about 20 hours of operation. On the other hand, under the conditions of the example, the surface of the bath was not very agitated and fluctuations of electric power remained lower than 10% of the prescribed value. The volatilization of lead (collected together with the zinc through duct 7) was equal to 8% of the lead present in the starting slag.

Example II

The process of the invention was carried out in the same furnace as described in example I, with the difference that the lower end of tube 6 was located 5 cm above the bottom of crucible 1. The operating conditions were identical.

After 5 hours of operation, the lead content of the slag had fallen to 0.5% by weight, the tin content to 0.25% by weight and the zinc content to 2% by weight. During the treatment, the stability of operation was good, fluctuations of electric power were not higher than 10% of the prescribed value, and the volatilization of lead remained equal to 8% of the lead present in the starting slag.

Example III

The process of the invention was carried out in the same furnace as described in the preceding example, tube 6 having its lower end located at 5 cm of the bottom of crucible 1.

700 kg of a liquid slag containing, in % in weight, 10 Pb, 1.8 Sn, 5.7 Zn, 16 CaO, 21 $SiO_2$, 18 Fe, was treated in the furnace. 185 kg of lead was first added; it melted and collected at the bottom of the furnace, thereby forming a layer with a height of 5 cm. Natural gas was then injected through tube 6, while applying the same operating conditions as in the preceding examples. After 5 hours of injection, the lead content of the slag had fallen to 0.3% by weight, the tin content to 0.25% by weight and the zinc content to 2% by weight.

It should be noted that, when operating under identical conditions but without addition of 185 kg of lead, the composition of the slag, after 5 hours of injection is: 0.3% by weight Pb, 1.3% by weight Sn and 2% by weight Zn.

Example IV

The process of the invention was carried out in the furnace illustrated by FIG. 2. The furnace had a rectangular section, with an inside width of 50 cm and an inside length of 130 cm. It comprised essentially a crucible 11, three graphite electrodes 12 disposed in line in the length of the furnace, a feeding trough 13, an upper tap hole 14 and a lower tap hole 15, a roof 16, two tubes 17 for blowing non-oxidizing gas in the lower part of crucible 11 and an exhaust duct 18. Charging doors (not shown) were provided in roof 16 for the distribution of solid materials on the surface of the bath. Tubes 17 were alumina. Their inside diameter was 6 mm, and their lower end was located 5 cm above the bottom of crucible 11.

In this furnace a slag, containing, in % in weight, 40 Pb, 2.5 Sn, 4.5 Zn, 3.7 CaO, 12 $SiO_2$ and 11 Fe, was fed in the liquid state through the feeding trough 13, at a rate of 45 kg/h. Natural gas was injected through each of the tubes 17 with a flow of 0.6 Nm3/h, and coke was added in such a way that the slag bath 20 was constantly covered with a thin layer of coke. Lime was also added at an average rate of 1.8 kg/h. The lime and coke were introduced through the charging doors provided in roof 16. The mixture of coke and lime distributed on the surface of the bath is designated by 19. The temperature of the slag was kept at about 1210° C. by supplying a power of 18 kW to the electrodes 12.

Lead and tin which were extracted from the slag 20 formed a metallic phase 21. Zinc, which was also extracted from the slag, left the furnace through duct 18.

After filling the furnace up to a bath height of 50 cm, the slag 20 and the metal 21 were periodically tapped through upper tap hole 14 and lower tap hole 15, respectively, at such a frequency that the height of the slag layer always remained between about 35 and about 40 cm, and the height of the metal layer between about 7 and about 12 cm. The weight of slag contained in the furnace then varied from 800 to 915 kg.

When the furnace had reached steady operating conditions, which took about 50 h, the composition of the slag which was tapped from the tap hole 14 stabilized itself at 0.36% by weight Pb, 0.29% by weight Sn and 1.5% by weight Zn. The volatilization of lead was equal to 10% by weight of the lead present in the starting slag.

While the invention has been described in connection with the preferred embodiments, it is not intended to limit the invention to the particular forms set forth, but, on the contrary, it is intended to cover such alternatives, modifications and equivalents as may be included within the spirit and scope of the invention as defined by the appended claims.

We claim:

1. A process for the extraction of non-ferrous metals from slag material comprising heating these materials by resistance to a molten state in an electric furnace with submerged electrodes, placing a layer of solid reducing agent above the molten slag material, and injecting a non-oxidizing gas into the molten slag material in a manner to produce efficient stirring of the material, the non-oxidizing gas being injected at a flow rate of between about 0.5 and about 10 Nm3/h/ton of material being treated.

2. The process of claim 1, further comprising extracting the non-ferrous metals in liquid form and the flow rate of non-oxidizing gas is between about 0.5 and about 2.5 Nm3/h/ton of material being treated.

3. The process of claimes 1 or 2 wherein, for a slag having at least two non-ferrous metals, one of which is more readily reduced, at least part of the operation is carried out in the presence of a liquid layer of the more readily reduced metal at which time the non-oxidizing gas is injected into the layer of liquid metal to promote contact between the liquid metal and the slag thereby dissoluting the less readily reduced metal into the more readily reduced metal.

4. The process of claim 3 wherein the layer of liquid metal is formed during reduction of the slag.

5. The process of claim 3 wherein reduction of the slag is started in the presence of the layer of liquid metal.

6. The process of claim 1 wherein the non-oxidizing gas is a hydrogen-containing gas.

7. The process of claim 6 wherein the hydrogen-containing gas is reformed natural gas.

8. The process of claim 1 wherein the non-oxidizing gas is natural gas.

9. The process of claim 8 wherein the speed of injection of the natural gas in the material being treated is greater than about 5 m/sec.

10. The process of claim 1 wherein the materials to be treated are fed in the liquid form and fluxes are distributed on the surface of the molten material.

11. The process of claim 1 carried out at a temperature between about 1100° C. and about 1250° C.

12. The process of claim 1 carried out continuously and the flow rate of non-oxidizing gas is between about 0.5 and about 1.5 Nm3/h/ton of material being treated.

13. The process of claim 12 wherein the furnace has an elongated shape and the materials to be treated enter at one end of the furnace and depleted slag exits at the opposite end.

* * * * *